Aug. 14, 1934.  F. J. MARKOSEK  1,969,852
INFRA-RED RAY CONVERTER
Filed July 6, 1932   3 Sheets-Sheet 1
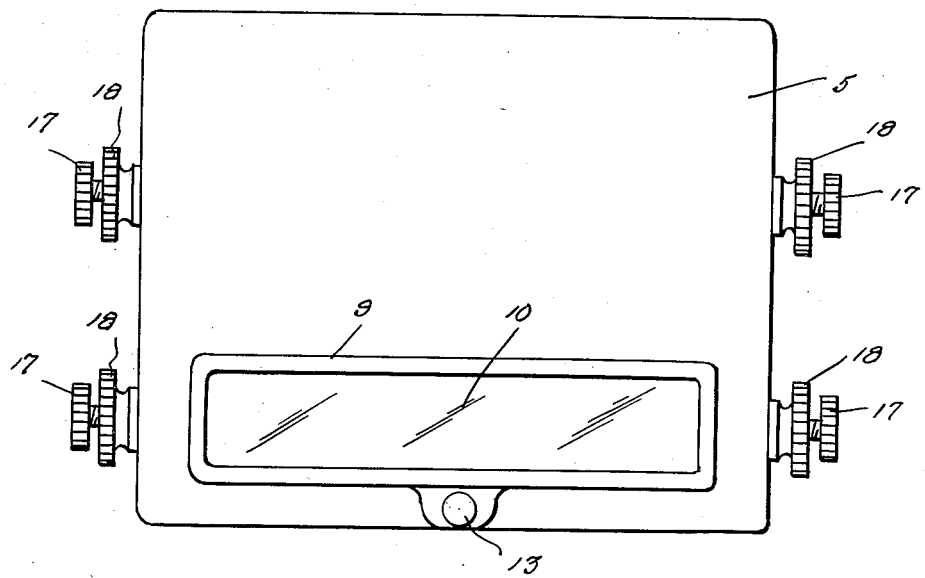
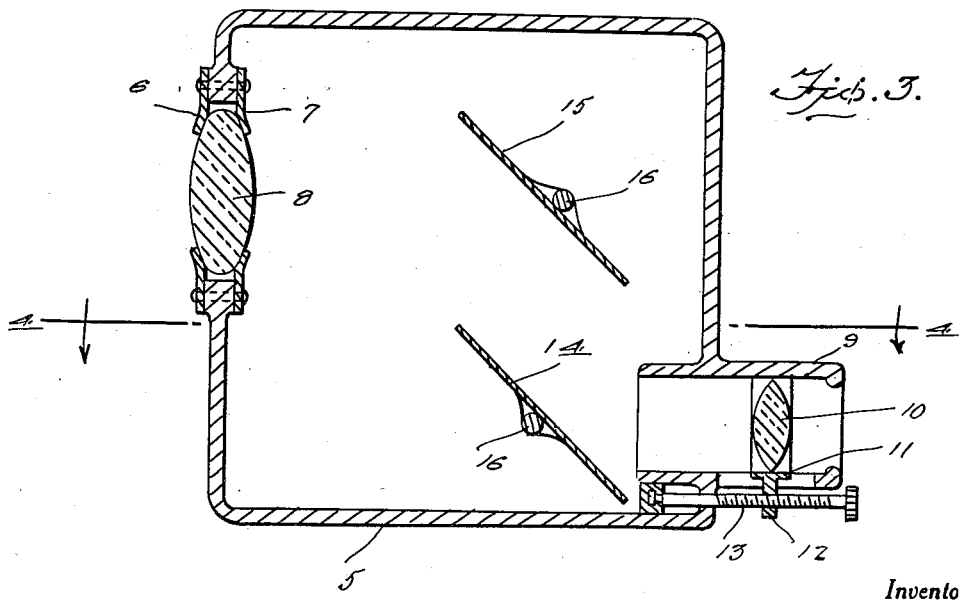
Inventor
Frank J. Markosek
By Clarence A. O'Brien
Attorney Aug. 14, 1934.  F. J. MARKOSEK  1,969,852
INFRA-RED RAY CONVERTER
Filed July 6, 1932  3 Sheets-Sheet 2
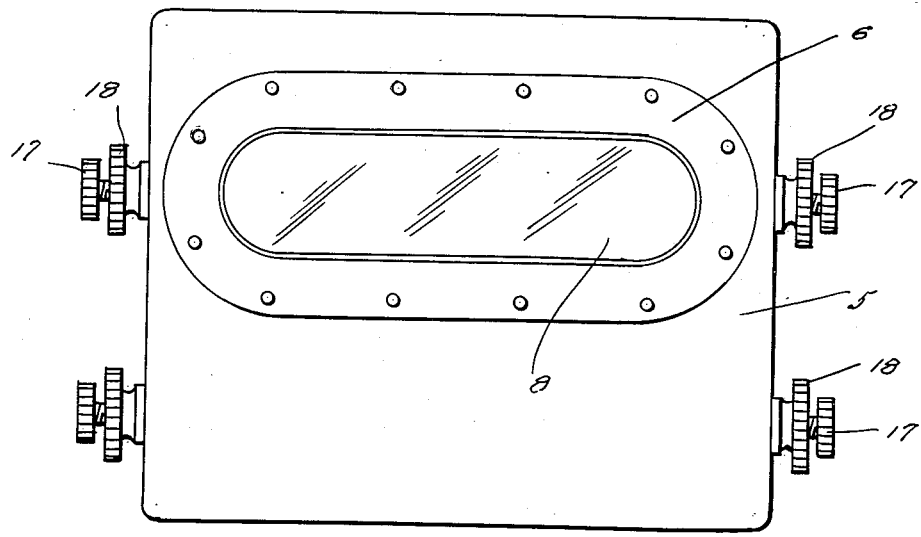
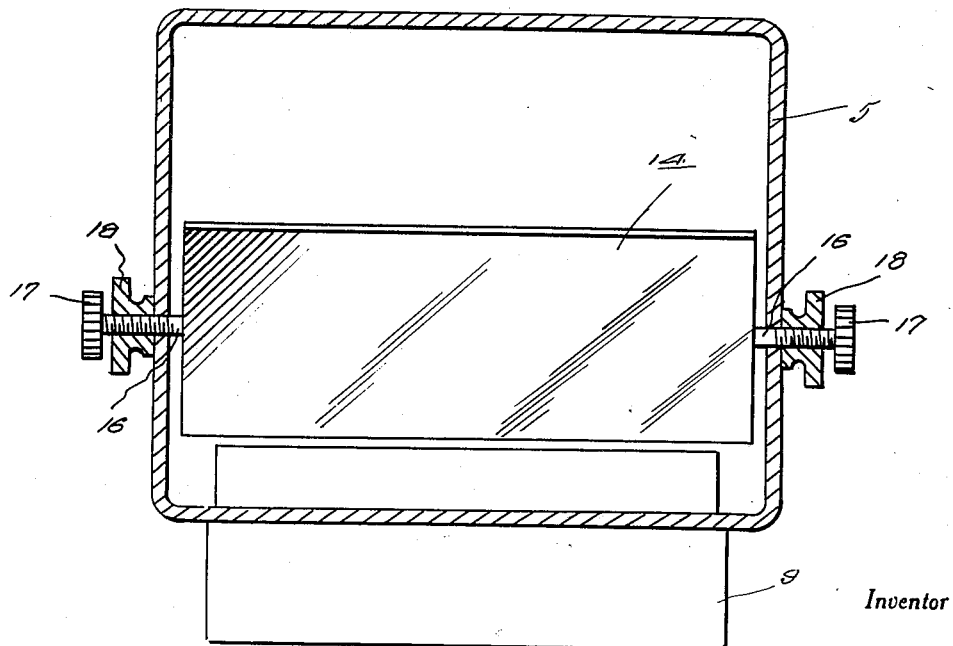
Inventor
Frank J. Markosek
By Clarence A. O'Brien
Attorney Aug. 14, 1934.   F. J. MARKOSEK   1,969,852
INFRA-RED RAY CONVERTER
Filed July 6, 1932   3 Sheets-Sheet 3
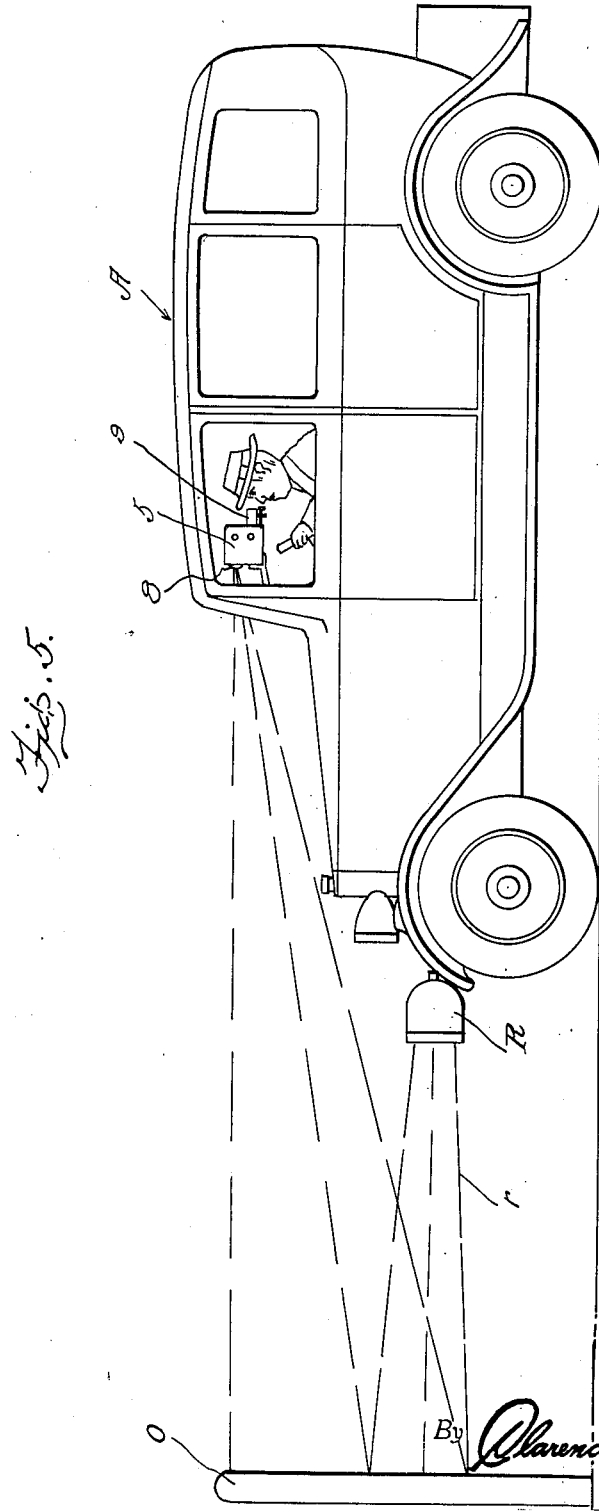
Inventor
Frank J. Markosek
By Clarence A. O'Brien
Attorney Patented Aug. 14, 1934

1,969,852

UNITED STATES PATENT OFFICE 1,969,852

INFRA-RED RAY CONVERTER

Frank J. Markosek, Bridgeville, Pa.

Application July 6, 1932, Serial No. 621,123

1 Claim. (Cl. 250—1)

This invention relates to a novel device or appliance to be hereinafter referred to as an infra-red ray converter.

The device has more specific reference to a structure of appropriate proportions, dimensions and material specifically constructed to be used in conjunction with an infra-red ray generator of a well known type, the device to be used either as an accessory or attachment or, if desired, as an integral part of the aforesaid generator.

The purpose of the invention is to provide simple and effective means of rendering an object or objects visible in fog or smoke, whereby a structure which may be used successfully in connection with aircraft, motor vehicles, marine conveyances and the like, particularly for military purposes.

Briefly stated, the preferred embodiment of the invention comprises a casing or enclosure provided with a suitable lens to intercept, converge and amplify the infra-red rays from the generator, the converging rays being projected on a special primary mirror and from the primary mirror to a secondary mirror which latter mirror is located in alinement with the observer's eye lens.

The explicit details selected for accomplishing this important result will become more readily apparent from the following description and drawings.

In the drawings:

Figure 1 is a rear elevational view of a structure developed in accordance with the principles of the present invention.

Figure 2 is a front elevation thereof.

Figure 3 is a central vertical sectional view, and

Figure 4 is a horizontal section taken approximately on the plane of the line 4—4 of Figure 3.

Figure 5 is a view illustrating one application and use of my invention.

The casing or housing which may be of appropriate materials and proportions is generally designated by the numeral 5. It is here shown as in the form of a hollow rectangular box having a sight opening in its front wall. Surrounding the marginal edge of the opening and attached to the box is an appropriate retaining frame made up of inner and outer sustaining rims 6 and 7 for a double convexed intake lens 8 of appropriate proportions so that it will have the property of converging the intercepted light rays to the requisite or predetermined degree.

The rear wall of the box is provided adjacent its bottom with a horizontally elongated neck 9 in which the receptive or observer's lens 10 is adjustably mounted. This lens is mounted in a suitable frame 11 having a threaded lug or ear 12 cooperable with an adjusting screw 13 whereby said lens may be adjusted in and out for the proper focus. Mounted on the interior of the box near the bottom thereof and in alinement with the lens 10 is an ordinary silvered mirror 14. Also mounted in the box above the mirror 14 is a special polished platinum reflector 15. In effect both of these members 14 and 15 are mirrors, the mirror 15 being located in alinement with the lens 8 and mirror 14 in alinement with the lens 10. The mirrors are arranged in superposed vertically spaced relation with respect to each other with their reflecting faces in opposed parallelism. Both of the reflectors are provided with journals or studs 16 extending through and beyond bearing openings in the end walls of the box and terminating in knurled knobs or finger grips 17. The numerals 18 merely designate lock nuts carried by the threaded portion of the journal for holding the mirrors in adjusted position.

Although the platinum mirror or reflector plate 15 is necessarily expensive, it is desirable for the purpose intended because of its unusual virtue of atomic activity, thus rendering said mirror 15 susceptible of converting the long infra-red ray waves into the visible spectrum.

In Figure 5 I have shown one manner of use of the invention, and in this figure it will be seen that the automobile A is provided with an infra-red ray generator R suitably mounted at the front of the automobile, while my improved infra-red ray converter is suitably mounted within the automobile and in such a position as to be conveniently used by the operator. The object to be observed may be a post or other such object and is designated by the reference character O. The use of the invention in this connection will be clear from the following:

The infra-red ray waves $r$ from the infra-red ray generator R are, in practice, thrown on the object O desired to be observed and reflected by suitable means through the lens 8, against the platinum plates 15, from the plate 15 to the mirror 14 and then outwardly through the neck 9 and its encased lens 10. This treatment of light rays in the converter serves to render the object visible. In fact it has been discovered that the result will be a magnified version of a well defined outline or image of the object depending on the strength of the light rays generated.

The gist of the invention is in the provision of a simple lightproof box having an appropriate convex lens mounted in the side opening in the front wall together with the spaced parallel opposed mirrors located in said box in proper alinement with each other as well as the two lenses with which they cooperate. Particular importance however is predicated upon the converging lens 8 for focusing the light rays against the tilted reflecting face of the platinum plate or mirror 15, and from the latter the mirror 14, and from the mirror 14 to the magnifying observer's lens 10 mounted in the shielding and protective neck on the back wall of the box.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

Having thus described my invention, what I claim as new is:

In a device of the character described, a closed rectangular box, lens means mounted in the front wall of said box near the top thereof and arranged to convey rays reflected thereon from an ordinarily invisible object having impinged thereon rays from a source of infra-red rays, an infra-red ray rectifying mirror within said box in the focal plane of said lens means arranged to rectify the rays conveyed thereto by said lens means, a plain mirror below said rectifying mirror, and viewing lens means mounted in the back wall of said box near the bottom thereof, said plain mirror being in the focal plane of said viewing lens means and said mirror being arranged so that converted rays are reflected to said plain mirror from said rectifying mirror whereby said object is rendered visible in said viewing lens means, said lens means, said viewing lens means, and said mirrors being horizontally elongated, and said mirrors being pivoted at their opposite ends to the opposite side walls of said box so as to be capable of being given different relative angularities.

FRANK J. MARKOSEK.